3,184,428
PREVENTION OF COLORED IRON COMPOUNDS IN ASBESTOS CONTAINING POLYVINYL CHLORIDE RESINS
Arthur C. Hecker, Forest Hills, Mark W. Pollock, Bronx, and Seymour Cohen, Brooklyn, N.Y., assignors to Argus Chemical Corporation, Brooklyn, N.Y., a corporation of New York
No Drawing. Filed Apr. 17, 1961, Ser. No. 103,208
1 Claim. (Cl. 260—41)

This invention relates to a process for bleaching colored iron compounds in polyvinyl chloride resins containing asbestos, and to a process for preventing the formation of colored iron compounds due to the incorporation of commercial grade iron-containing asbestos with such resins, as in the manufacture of floor tile compositions, to bleaching and stabilizing compositions useful for this purpose, and to the polyvinyl chloride resin compositions obtained by the use of such compositions. The invention is particularly applicable to the manufacture of pigmented asbestos floor tile containing a polyvinyl chloride resin as the principal thermoplastic material.

It is customary in manufacturing floor tile based on polyvinyl chloride resins to incorporate therewith a fibrous reinforcing agent or filler and a large proportion of pigment. The preparation of white or light colored floor tile compositions presents a particular problem, however. The principal reinforcing agent or filler employed in such compositions is asbestos. Purified iron-free asbestos can be employed, in which case the polyvinyl chloride resin floor tile retains its original color as established by the pigment and other ingredients during hot compounding at elevated temperatures. However, natural unpurified asbestos contains small amounts of iron compounds, believed to include ferrous and ferric silicates, and when this form of asbestos is incorporated in polyvinyl chloride resin floor tile compositions, a purple to bluish grey color develops on heating at temperatures of about 300° F. (150° C.) and higher. This color becomes quite pronounced even after only 15 minutes of heating. The color appears to arise due to reaction involving the iron compounds present in the asbestos, and seems to be specific for these types of iron compounds. Yellow iron oxide pigment, for example, does not give rise to the bluish color.

In accordance with this invention, it has been determined that this discoloration can be entirely avoided by incorporating as a color-protecting agent in the polyvinyl chloride resin composition containing the iron-containing asbestos, an organic compound having in the molecule the active group

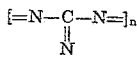

$n$ is an integer representing the number of such groups in the molecule. In aliphatic open chain compounds, $n$ is usually one or two, and in heterocyclic ring compounds where the group forms part of the ring, $n$ is usually one, two or three.

The color protecting agents of the invention thus can be defined by the following general formula:

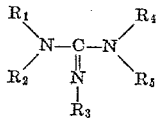

In the above formula $R_1$, $R_2$, $R_3$, $R_4$ and $R_5$ are selected from the group consisting of hydrogen, alkyl, alkenyl, aryl, alkylaryl, arylalkyl, cycloalkyl, hydroxyalkyl, cyano, amido, and acyl groups having from 1 to about 24 carbon atoms. $R_1$ and/or $R_2$ and $R_3$ and $R_4$ and/or $R_5$ can be taken together to form a heterocyclic ring including the active group in the molecule. The compound is sufficiently active to entirely prevent this discoloration if only one of these groups is present, but the compound can if desired include two or more such groups. The compound can, for example, be an aliphatic, aromatic or heterocyclic compound having from one to about fifty carbon atoms.

Typical $R_1$, $R_2$, $R_3$, $R_4$ and $R_5$ groups in addition to hydrogen include methyl, ethyl, propyl, isopropyl, n-butyl, isobutyl, secondary butyl, tertiary butyl, n-amyl, isoamyl, 2-ethylhexyl, n-hexyl, isohexyl, n-octyl, isooctyl, n-decyl, n-dodecyl, n-octadecyl, allyl, propenyl, phenyl, xylyl, benzyl, cresyl, cyclohexyl, cyclopentyl, methyl cyclohexyl, hydroxyethyl, hydroxypropyl, hydroxybutyl, acetyl, propionyl, butyryl, oleoyl, stearoyl, methoxy, ethoxy, butoxy, phenylphenyl, naphthyl, cycloheptyl, pyridyl, piperidinyl, furyl, triazinyl and guanamyl. Heterocyclic ring structures in which several R groups are taken together in the ring include the melamines, pyrimidine, guanamine and ammeline rings.

The simplest of the compounds of the invention is guanidine and this compound is particularly effective. Also especially effective are dicyandiamide and melamine, and these three compounds are preferred because of their effectiveness, availability and low cost. Additional compounds which can be employed include the substituted guanidines, such as diphenyl guanidine, acetyl guanidine, aminoguanidine, diacetyl guanidine, N-oxymethyl-N-cyan-guanidine, phenylaminoguanidine, N-carbethoxy-N'-cyanguanidine, N-oxymethyl-N'-cyanguanidine, N-methylguanidine, N,N-dimethylguanidine and N-cyclohexylguanidine; guanazole; ammelide; the triazines and the substituted triazines, such as imino-dimethyl-N-cyanhexahydrotriazine; substituted melamines, such as $N^2,N^4,N^6$-triphenylmelamine, 2,4,6-triethyl melamine, melon, melam, and melem; biguanide and substituted biguanides such as phenyl biguanide; guanamine and the substituted guanamines, such as acetoguanamine, N,N-dicarbethoxy guanamine, formoguanamine, ammeline, 2-amino-pyrimidine and substituted pyrimidines, such as 2-amino-4-methyl pyrimidine; acetyl-4-methyl-imino-urete; and 2-amino imidazole and substituted imidazoles, such as 2-amino-4-hydroxy-imidazole.

It is preferred that the color-protecting compound be neutral or have a low alkalinity. The alkaline or highly alkaline compounds can be added in the form of their salts with inorganic and organic acids, in which form they are approximately neutral or even acidic. Such salts include the hydrochloride, sulfate, nitrate, carbonate, stearate, acetate, and formate.

Very small amounts of these color-protecting agents are sufficient to prevent discoloration. Usually as little as 0.25% is effective. Excellent protection is obtained employing amounts of from about 0.5% to about 15%. Normally, amounts in excess of 15% are not required, and 20% represents the largest amount that would generally be employed. All of these amounts are based on the weight of polyvinyl chloride resin.

Incorporation of the color-protecting agent at the beginning of the compounding or milling operation in the preparation of the asbestos-filled polyvinyl chloride resin compositions prevents the development of discoloration.

Furthermore, the color-protecting agents of the invention have the additional property of acting as a bleaching agent, when incorporated in polyvinyl chloride resin compositions which have already been discolored by hot compounding with such iron compounds. All that is necessary is to incorporate the protective agent with the discolored resin at a hot compounding temperature, and then heat the blend at a temperature of about 250 to about 350° F. until the color has been bleached out. The bleaching becomes pronounced in five minutes, and the color continues to become lighter as the heating continues, usually being completely discharged in about one-half hour.

The manner in which the color-protecting agents of the invention prevent discoloration or effect decolorization is not understood. The phenomenon is apparently not related to heat stabilization of the polyvinyl chloride resin. The compounds of the invention add nothing to the stabilization of polyvinyl chloride resins without the asbestos.

The invention is applicable to any polyvinyl chloride resin composed of more than 50% of vinyl chloride. The term "polyvinyl chloride" is used herein to include resins consisting essentially of vinyl chloride polymer, and also copolymers of vinyl chloride with other copolymerizable monomers such as vinyl acetate and vinylidene chloride, as well as ethylene, in minor proportion. An example of such a copolymer is the copolymer of 87 parts of vinyl chloride with 13 parts of vinyl acetate. The invention also is applicable to polyvinyl chloride resins employed in admixture with other polymers, such as polyethylene, polypropylene, and polybutylene.

It is essential that the color protecting agent of the invention be stable at the compounding temperatures, i.e., at 300° F. (150° C.) or above, and be nonvolatile at temperatures up to the compounding temperature. It is preferable that it have a very low vapor pressure at room temperature or the temperature of use, so that it will be permanently retained in the resin composition. Also, it must be compatible with the resin composition both at the temperatures at which the composition is to be used and at the hot-compounding temperatures in the proportion necessary to obtain a stabilization against color development, or a decolorization.

These compounds are effective color-protecting agents with any of the commercial grades of asbestos containing ferrous and ferric silicates. Chrysotile asbestos is a typical example. This type of asbestos contains up to about 11% of ferrous and ferric silicates, calculated as ferrous and ferric oxides.

The polyvinyl chloride resin composition can contain other fillers in addition to the asbestos, such as calcium carbonate, silica, and calcined clays; and pigments such as titanium dioxide also can be present. The introduction of white pigments into the plastic as in a pigmented polyvinyl chloride resin floor tile makes the effect of the protective agent more conspicuous than otherwise would be the case.

The color-protecting agent is required even though the pigment used is an antacid, such as calcium carbonate, which would be expected to neutralize any hydrogen chloride liberated during hot compounding.

It also is customary to incorporate in the composition the usual plasticizers for polyvinyl chloride resins. Dioctyl phthalate, dibutyl sebacate, dioctyl sebacate, and tricresyl phosphate are exemplary. The plasticizer must be a liquid, and compatible with the resin at hot compounding temperatures, and must remain compatible and nonseparating in objectionable proportions at low winter temperatures. The plasticizer should be nonvolatile or volatilizable only at a very slow rate at ordinary temperatures.

As a supplemental plasticizer, there can be used a long chain organic epoxy compound such as the epoxidized unsaturated fatty acid glycerides, for example, epoxidized soybean oil and the epoxidized butyl, hexyl and octyl esters of oleic acid, linoleic acid and ricinoleic acid. These compounds give an effective plasticizing action. The epoxy compounds should have a boiling point in excess of the hot compounding temperature, and should be substantially nonvolatile at room temperature, so that they will be retained in the plastic composition.

A typical commercial floor tile composition in accordance with the invention will contain the components described above in the following proportions.

| Components: | Parts by weight |
|---|---|
| Polyvinyl chloride resin | 100 |
| Plasticizer | 15–60 |
| Asbestos containing iron silicates | 25–200 |
| Other filler | 10–200 |
| Pigment | 0–20 |
| Color-protecting agent | 0.25–20 |

It will be understood that the proportion of plasticizer is less when the plasticizer is an active solvent for the polyvinyl chloride resin, and higher when it is a less effective solvent for the polyvinyl chloride resin.

When the color-protecting agent is to prevent the development of color, it is introduced into the composition before or at the beginning of hot-compounding, that is, before there has been hot rolling or other mixing at the hot-compounding temperature. When the color-protecting agent is to discharge a color previously developed, it is introduced at the end of the hot-compounding operation. Compounding then is continued at temperatures of from 250 to 350° F. (120 to 200° C.) until the color has been discharged.

Ordinarily, the compounding of the polyvinyl chloride resin, asbestos and other fillers, pigments, plasticizers, color-protecting agent and other components is effected in conventional equipment, such as rubber mixing rollers, the temperature used being sufficiently high to enable blending of the components in a uniform mix. The composition is made flowable on the hot rolls, and rolling continued until the composition becomes uniform. This ordinarily requires about 5 to 30 minutes.

The following examples in the opinion of the inventors represent preferred embodiments of their invention. In all of the examples, the proportions are expressed as parts by weight.

EXAMPLES 1 TO 7

A group of polyvinyl chloride resin floor tile compositions having the following formulation was prepared and compounded as described below.

| Components: | Parts by weight |
|---|---|
| Resin—VYHH resin (copolymer of 87 parts vinyl chloride with 13 parts vinyl acetate) | 50 |
| Plasticizer— | |
| Dioctyl phthalate | 9 |
| Epoxidized soybean oil | 1 |
| Pigment—Titanium dioxide | 6 |
| Filler— | |
| Calcium carbonate | 80 |
| Asbestos as listed in the table below | 50 |
| Color-protecting agent—Listed in the table below | 0.55 to 1 |

The basic formula, the components shown above and in Table I which follows, were compounded at 275° F. (135° C.) for about 20 minutes on a two-roll rubber mill. Samples of the product were sheeted off and observed for color at the conclusion of this rolling period, and at 15 minute intervals thereafter during heating at 300° F. for a total of 2 hours. The filler and color-protecting agent used and the results of the heating tests are shown in Table I:

shows the effective stabilization obtained by the compounds of the invention.

EXAMPLES 9 to 13

A group of compositions having the following formulation was prepared and compounded as described below:

*Table I*

| Ex. No. | Filler | Color-protecting agent | Amount (parts by weight) | Color of resin | |
|---|---|---|---|---|---|
| | | | | On conclusion of milling | After 2 hrs. at 300° F. |
| A | Calcium carbonate | None | | White | White. |
| B | Purified iron-free asbestos | ___do___ | | Greyish white | Greyish white. |
| C | ___do___ | Dicyandiamide | 2.0 | ___do___ | Do. |
| D | Asbestos containing 2.7% ferrous and 3.3% ferric iron, present as the silicate and calculated as the oxides. | None | | Light bluish grey | Deep purple. |
| 1 | ___do___ | Dicyandiamide | 0.55 | Light grey | Light bluish grey. |
| 2 | ___do___ | ___do___ | 0.60 | ___do___ | Medium grey. |
| 3 | ___do___ | ___do___ | 0.65 | ___do___ | Do. |
| 4 | ___do___ | ___do___ | 0.70 | ___do___ | Light grey. |
| 5 | ___do___ | ___do___ | 0.75 | ___do___ | Do. |
| 6 | ___do___ | ___do___ | 1.0 | ___do___ | Do. |
| 7 | ___do___ | ___do___ | 2.0 | ___do___ | Do. |

It is apparent from the above results that when the composition is free from iron compounds, as in Examples A, B, and C, no discoloration is observed. In the case of Example D, however, a composition containing iron-containing asbestos, a bluish grey to deep purple color is obtained. Examples 1 to 7 show that this composition fails to develop any color when dicyandiamide is added at the beginning of compounding in a sufficient amount. The protective action of the dicyandiamide increased, and excellent protection is obtained at amounts above 0.75 part per 50 parts of resin, no discoloration whatever being noted over the two hour heating period.

EXAMPLE 8

Examples 1 to 7 were repeated, but the test was carried out by continuing the milling of the composition on the rolls for the entire two hour test period. This is a more rigorous test, since it incorporates oxygen in the material throughout the test period. The samples at the start of the milling were a pale grey, exactly as in the control sample initially, and at the conclusion of the two hour milling period the original color was unchanged. This Components: Parts by Weight
Resin—VYHH resin (copolymer of 87 parts vinyl chloride with 13 parts vinyl acetate) _____ 50
Plasticizer—
    Dioctyl phthalate _____ 9
    Epoxidized soybean oil _____ 1
Pigment—Titanium dioxide _____ 6
Filler—
    Calcium carbonate _____ 80
    Asbestos as listed in the table below _____ 50
Color-protecting agent—Listed in the table below _____ 0.75 to 2

The basic formula, the components shown above and in Table II which follows, were compounded at 275° F. for about 20 minutes on a two roll rubber mill. Samples of the product were sheeted off and observed for color at the conclusion of this rolling period, and at 15 minute intervals thereafter during heating at 300° F. for a total of 2 hours. The filler and color-protecting agent used and the results of the heating tests are shown in Table II:

*Table II*

| Ex. No. | Filler | Color-protecting agent | Amount (parts by weight) | Color of resin | |
|---|---|---|---|---|---|
| | | | | On conclusion of milling | After 2 hrs. at 300° F. |
| A | Calcium carbonate | None | | White | White. |
| B | Purified iron-free asbestos | ___do___ | | Greyish white | Greyish white. |
| C | ___do___ | Melamine | 2.0 | ___do___ | Do. |
| D | Asbestos containing 2.7% ferrous and 3.3% ferric iron, present as the silicate and calculated as the oxides. | None | | Light bluish grey | Deep purple. |
| 9 | ___do___ | Dicyandiamide | 0.75 | Light grey | Light grey. |
| 10 | ___do___ | Melamine | 0.75 | ___do___ | Do. |
| 11 | ___do___ | {Dicyandiamide / Melamine} | {0.375 / 0.375} | ___do___ | Do. |
| 12 | ___do___ | Dicyandiamide | 2.0 | ___do___ | Do. |
| 13 | ___do___ | Melamine | 2.0 | ___do___ | Do. |

The above data show melamine and dicyandiaminde to be equally effective, both alone and in combination.

EXAMPLES 14 TO 16

A group of formulations having the following formulations were prepared and compounded as described below.

| Components: | Parts by weight |
|---|---|
| Resin—VYHH resin (copolymer of 87 parts vinyl chloride with 13 parts vinyl acetate) | 50 |
| Plasticizer— | |
| Dioctyl phthalate | 9 |
| Epoxidized soybean oil | 1 |
| Pigment—Titanium dioxide | 6 |
| Filler— | |
| Calcium carbonate | 80 |
| Asbestos as listed in the table below | 50 |
| Guanidine carbonate—Listed in the table below | 1 to 2 |

| Components: | Parts by weight |
|---|---|
| Plasticizer— | |
| Dioctyl phthalate | 9 |
| Epoxidized soybean oil | 1 |
| Pigment—Titanium dioxide | 6 |
| Filler— | |
| Calcium carbonate | 80 |
| Asbestos as listed in the table below | 50 |
| Color-protecting agent—Listed in the table below | 1 to 2 |

The basic formula, the components shown above and in Table IV which follows, were compounded at 275° F. (135° C.) for about 20 minutes on a two-roll rubber mill. Samples of the product were sheeted off and observed for color at the conclusion of this rolling period, and at 15 minute intervals thereafter during heating at 300° F. for a total of 2 hours. The filler and color-protecting agent

*Table III*

| Ex. No. | Filler | Color-protecting agent | Amount (parts by weight) | Color of resin | |
|---|---|---|---|---|---|
| | | | | On conclusion of milling | After 2 hrs. at 300° F. |
| A | Calcium carbonate | None | | White | White. |
| B | Purifed iron-free asbestos | do | | Greyish white | Greyish white. |
| C | do | Guanidine carbonate. | 2.0 | do | Do. |
| D | Asbestos containing 2.7% ferrous and 3.3% ferric iron, present as the silicate and calculated as the oxides. | None | | Light bluish grey | Deep purple. |
| 14 | do | Guanidine carbonate. | 1.0 | do | Light bluish grey. |
| 15 | do | do | 2.0 | do | Pale yellow grey. |
| 16 | do | Guanidine carbonate. Dicyandiamide | 2.0 0.2 | Light grey | Light yellow grey. |

It is apparent that when the composition is free from iron compounds, no discoloration is observed. Guanidine carbonate does not preserve the light grey color of the initial material, but it does prevent the development of intense discoloration, and the product at the conclusion of the test retains a light yellow grey color, quite satisfactory for many shades of polyvinyl chloride resin floor tile. The color is slightly lessened by the use of a very small amount of dicyandiamide together with the guanidine carbonate,

EXAMPLES 17 TO 19

A group of polyvinyl chloride resin floor tile compositions having the following formulation was prepared and compounded as described below.

| Components: | Parts by weight |
|---|---|
| Resin—VYHH resin (copolymer of 87 parts vinyl chloride with 13 parts vinyl acetate) | 50 | used and the results of the heating tests are shown in Table IV:

*Table IV*

| Ex. No. | Filler | Color-protecting agent | Amount (parts by weight) | Color of resin | |
|---|---|---|---|---|---|
| | | | | On conclusion of milling | After 2 hrs. at 300° F. |
| A | Calcium carbonate | None | | White | White. |
| B | Purified iron-free asbestos | do | | Greyish white | Greyish white. |
| C | do | Stearoguanamine | 2.0 | do | Do. |
| D | Asbestos containing 2.7% ferrous and 3.3% ferric iron, present as the silicate and calculated as the oxides. | None | | Light bluish grey | Deep purple. |
| 17 | do | Stearoguanamine | 1.0 | Light grey | Medium bluish grey. |
| 18 | do | do | 1.5 | do | Light grey. |
| 19 | do | do | 2.0 | do | Do. |

It is apparent from the above results that when the composition is free from iron compounds, as in Examples A, B and C, no discoloration is observed. In the case of Example D, however, a composition containing iron-containing asbestos, a bluish grey to deep purple color is obtained. Examples 17 to 19 show that this composition fails to develop any color when stearoguanamine is added at the beginning of compounding in a sufficient amount. The protective action of the stearoguanamine increases as the amount is increased, and excellent protection is obtained at amounts above 1 part per 50 parts of resin, no discoloration whatever being noted over the two hour heating period.

EXAMPLES 20 TO 22

A group of compositions having the following formulation was prepared and compounded as described below.

| Components: | Parts by weight |
|---|---|
| Resin—VYHH resin (copolymer of 87 parts vinyl chloride with 13 parts vinyl acetate) | 50 |
| Plasticizer— | |
| Dioctyl phthalate | 9 |
| Epoxidized soybean oil | 1 |
| Pigment—Titanium dioxide | 6 |
| Filler— | |
| Calcium carbonate | 80 |
| Asbestos as listed in the table below | 50 |
| Color-protecting agent—Listed in the table below | 1 to 2 |

The basic formula, the components shown above and in Table V which follows, were compounded at 275° F. for about 20 minutes on a two roll rubber mill. Samples of the product were sheeted off and observed for color at the conclusion of this rolling period, and at 15 minute intervals thereafter during heating at 300° F. for a total of 2 hours. The filler and color-protecting agent used and the results of the heating tests are shown in Table V:

*Table V*

| Ex. No. | Filler | Color-protecting agent | Amount (parts by weight) | Color of resin | |
|---|---|---|---|---|---|
| | | | | On conclusion of milling | After 2 hrs. at 300° F. |
| A | Calcium carbonate | None | | White | White. |
| B | Purified iron-free asbestos | None | | Greyish white | Greyish white. |
| C | do | Acetoguanamine | 2.0 | do | Do. |
| D | Asbestos containing 2.7% ferrous and 3.3% ferric iron, present as the silicate and calculated as the oxides. | None | | Light bluish grey | Deep purple. |
| 20 | do | Acetoguanamine | 2.0 | Light grey | Light grey. |
| 21 | do | Benzoguanamine | 2.0 | do | Do. |
| 22 | do | Stearoguanamine | 2.0 | do | Do. |

Acetoguanamine, benzoguanamine and stearoguanamine, as the above data show, are equally effective as color protecting agents in accordance with the invention.

EXAMPLES 23 to 27

A group of compositions having the following formulation was prepared and compounded as described below:

| Components: | Parts by weight |
|---|---|
| Resin—Polyvinyl chloride resin homopolymer | 50 |
| Plasticizer— | |
| Dioctyl phthalate | 9 |
| Epoxidized soybean oil | 1 |
| Pigment—Titanium dioxide | 6 |
| Filler— | |
| Calcium carbonate | 80 |
| Asbestos as listed in the table below | 50 |
| Color-protecting agent—Listed in the table below | 1 to 2 |

The basic formula, the components shown above and in Table VI which follows, were compounded at 300° F. for about 20 minutes on a two roll rubber mill. Samples of the product were sheeted off and observed for color at the conclusion of this rolling period, and at 15 minute intervals thereafter during heating at 300° F. for a total of 2 hours. The filler and color-protecting agent used and the results of the heating tests are shown in Table VI:

*Table VI*

| Ex. No. | Filler | Color-protecting agent | Amount (parts by weight) | Color of resin | |
|---|---|---|---|---|---|
| | | | | On conclusion of milling | After 2 hrs. at 300° F. |
| A | Calcium carbonate | None | | White | White. |
| B | Purified iron-free asbestos | do | | Greyish white | Greyish white. |
| C | Asbestos containing 2.7% ferrous and 3.3% ferric iron, present as the silicate and calculated as the oxides. | do | | Light bluish grey | Deep purple. |
| 23 | do | Dicyandiamide | 1.0 | Light grey | Light grey. |
| 24 | do | Melamine | 1.0 | do | Do. |
| 25 | do | {Dicyandiamide / Melamine} | {0.50 / 0.50} | do | Do. |
| 26 | do | Dicyandiamide | 2.0 | do | Do. |
| 27 | do | Melamine | 2.0 | do | Do. |

It is apparent from the above results that when the composition is free from iron compounds, as in Examples A and B, no discoloration is observed. In the case of Example C, however, a composition containing iron-containing asbestos, a bluish grey to deep purple color is obtained. Examples 23 to 27 show that this composition fails to develop any color when dicyandiamide or melamine is added at the beginning of compounding.

We claim:

A method of bleaching a discolored polyvinyl chloride resin composition containing a colored iron compound formed by heating the composition at an elevated temperature of about 150° C. in the presence of iron-containing asbestos which comprises blending with the discolored polyvinyl chloride resin composition an amount sufficient to lessen the intensity of the color of an organic compound having the formula:

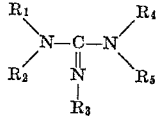

wherein $R_1$, $R_2$, $R_3$, $R_4$ and $R_5$ each have from one to about twenty-four carbon atoms, and are selected from the group consisting of hydrogen, alkyl, alkenyl, aryl, alkylaryl, arylalkyl, cycloalkyl, hydroxyalkyl, cyano, amido, and acyl; and heterocyclic rings including the active group in the molecule wherein an of $R_1$, $R_2$, $R_3$, $R_4$ and $R_5$ are taken together.

References Cited by the Examiner

UNITED STATES PATENTS

| | | | |
|---|---|---|---|
| 2,367,483 | 1/45 | Cheyney | 260—45.9 |
| 2,410,775 | 11/46 | Cox et al. | 260—45.9 |
| 2,491,443 | 12/49 | Cox et al. | 260—45.9 |
| 2,899,398 | 8/59 | Pflaumer | 260—45.9 |
| 3,084,135 | 4/63 | Scullin | 260—41 |

FOREIGN PATENTS 522,953   3/56   Canada.

ALEXANDER H. BRODMERKEL, *Primary Examiner.*

DANIEL ARNOLD, MORRIS LIEBMAN, LESLIE H. GASTON, *Examiners.*

UNITED STATES PATENT OFFICE
CERTIFICATE OF CORRECTION

Patent No. 3,184,428                                          May 18, 1965

Arthur C. Hecker et al.

It is hereby certified that error appears in the above numbered patent requiring correction and that the said Letters Patent should read as corrected below.

Column 5, ninth line after Table I, after "dicyandiamide" insert -- increases as the amount is --; column 8, line 3, for "Diocetyl" read -- Dioctyl --; column 11, line 6, for "an" read -- any --.

Signed and sealed this 30th day of November 1965.

(SEAL)
Attest:

ERNEST W. SWIDER                                                 EDWARD J. BRENNER
Attesting Officer                                                    Commissioner of Patents